United States Patent
Hou

(10) Patent No.: US 7,814,033 B2
(45) Date of Patent: Oct. 12, 2010

(54) CONTROL METHOD TO MAKE IC'S OPERATION MODE TO BE PROVIDED WITH UNCERTAINTY

(76) Inventor: Chien-Tzu Hou, 38881 Garibaldi Common, Fremont, CA (US) 94536

( * ) Notice: Subject to any disclaimer, the term of this patent is extended or adjusted under 35 U.S.C. 154(b) by 817 days.

(21) Appl. No.: 09/908,725

(22) Filed: Jul. 20, 2001

(65) Prior Publication Data

US 2003/0065406 A1 Apr. 3, 2003

(51) Int. Cl.
*G06F 15/18* (2006.01)
(52) U.S. Cl. ........................................................ 706/13
(58) Field of Classification Search .................... 706/13
See application file for complete search history.

(56) References Cited

OTHER PUBLICATIONS

Control and management architecture for multipoint videoconferencing over ATM networksYang, C.-H.; Hou, T.-C.; Wen, C.-C.; Yang, H.-J.; Chen, K.-J.; Integrated Network Management, 1999. Distributed Management for the Networked Millennium.; pp. 887-900.*
Queueing analysis for ATM switching of mixed continuous-bit-rate and bursty traffic Hou, T.-C.; Wong, A.K.;INFOCOM '90. Ninth Annual Joint Conference of the IEEE Computer and Communication Societies. 'The Multiple Facets of Integration' 1990, pp. 660-667.*
Performance characterizations of traffic monitoring, and associated control, mechanisms for broadband 'packet' networks Berger, A.W.; Eckberg, A.E.; Hou, T.-C.; Lucantoni, D.M.;Global Telecommunications Conference, 1990, IEEE, pp. 350-354.*
Effects of output buffer sharing on buffer requirements in an ATDM packet switchingEckberg, A.E.; Hou, T.-C.; INFOCOM '88. Networks: Evolution or Revolution? Proceedings. Seventh Annual Joint Conference of the IEEE 1988, pp. 459-466.*
An improved genetic algorithm integrated with a sequential number-theoretic method Lian-Qiao Cai; Jian Chen;Systems, Man, and Cybernetics, 1999. IEEE SMC '99 Conference Proceedings. 1999 IEEE International Conference on , vol. 1 ,p. 653-658.*

* cited by examiner

*Primary Examiner*—Anthony Knight
*Assistant Examiner*—Michael B. Holmes
(74) *Attorney, Agent, or Firm*—Karl F. Milde, Jr.; Eckert Seamans Chorin & Mellott, LLC

(57) ABSTRACT

The invention is related to a control method to make IC's operation mode to be provided with uncertainty, wherein a Genetic Random Number is produced with the first use of IC, and a Run-Time Random Number is produced with every use of IC, both numbers are produced from the Random Number pool in IC, and then produce a long serial number through hash function, which include a plurality of control bits to serve as the function control of data shuffle for IC data access, path and direction for data flow, etc. The said long serial number varies with the random number during each time of execution, thus the control method of the long serial number is various and the IC's operation mode is provided with uncertainty. As IC is applied to e-commerce, data security or encryption/decryption process, due to the uncertainty of IC's behavior, a hacker cannot catch the fixed IC's operation mode to break through it just through analysis to a single IC, therefore the data security can be protected.

7 Claims, 7 Drawing Sheets

CONTROL METHOD TO MAKE IC'S OPERATION MODE TO BE PROVIDED WITH UNCERTAINTY

BACKGROUND OF THE INVENTION

1. Field of the Invention

The invention relates to a control method to make IC's operation mode to be provided with uncertainty, particularly to the usage of a long serial number which is produced from two sets of random numbers to serve as control signal of IC's behavior, wherein ways of control vary with the variation of the random numbers, thus the design of IC's operation mode can be provided with uncertainty.

2. Description of the Prior Art

Whereas, as the global has gradually developed towards computerization and digitalization, many commercial behaviors have translated into application of information technology, enjoying the efficiency, convenience and business opportunity brought by Internet and Intranet. Almost everyone holds a credit card, and IC cards for gate restriction, ID verification, system setup and shutdown, in which are normally stored with such extremely confidential information as personal data, password, or service priority, etc. and not intended to be shown to others (including the holder). In general, the IC cards which are obtained either due to personal or positional reason, and absolutely most of those who own the cards should take good care of them and reserve them due to either ethical reason or personality cultivation. However, due to the process of digital formalization of these data into digital data flow, such as 0, 1, after an IC card has been inserted into a card reader, it shall be read by the card reader and transferred to a system for verification or password check. During the process, the IC card's identification code may be caught in the first timing, the password be caught in the second timing, and the password be caught to perform data encoding/decoding operation in the third timing. Those operation procedures remain unchanged in the card reader. In other words, once the sequence flow of the operation of the card reader is known, through observation method (observing the changes of IC voltage and current), a hacker may analyze the difference of each IC card and figure out the key of the card reader. No matter whatever encoding manner the IC card's data are produced, the data stored in it could be fully exposed externally, not to mention the security.

Moreover, assuming IC catches data with different delay time; for example, delays for 800 clock to catch the identification code, delays for 1200 clock to catch the password, delays for 1000 clock to process data encryption/decryption, so as to mix up the reading sequence of IC, yet its mean delay value is 1000 clock. Owing to the delay operation is produced in real random manner, to a person skilled in the art, the characteristics of IC operation can be solved through more mean tests to get its mean value, thus IC still can't be protected thoroughly.

Therefore, if we can make IC's behavior mode to be provided with uncertainty, that is the mean delay value produced in each IC processing is different, then a hacker can hardly observe the IC's characteristics through observation method or conducting mean test. Even if a hacker is lucky enough to calculate the correct timing point, but it is still impossible to apply this specific IC analysis to other IC (the probability is close to zero).

SUMMARY OF THE INVENTION

Whereas, the main object of the invention is to provide a control method to make IC's operation mode to be provided with uncertainty, wherein a Genetic Random Number is produced with the first use of IC, and a Run-Time Random Number is produced with every use of IC, both numbers are produced from the Random Number pool in IC, and then produce a long serial number through hash function, which include a plurality of control bits to serve as the function control of data shuffle for IC data access, path and direction for data flow, etc. The said long serial number varies with the random number during each time of execution, thus the control method of the long serial number is various and IC's operation mode is provided with uncertainty. As IC is applied to e-commerce, data security or encryption/decryption process, due to the uncertainty of IC's behavior, a hacker cannot catch the fixed IC's operation mode and break through it just through the analysis to a single IC, therefore the data security can be protected.

Accordingly, as the said long serial number serves for data shuffle control, wherein each control bit is served as initial control signal of the exchanger of Data Shuffle Net respectively, to decide whether each bit of data flow entering into IC shall be engaged in exchange and the data shuffle complexity, the data after exchange will formulate encoding data, and the encoding mode varies with the long serial number, thus can ensure the security of data.

Accordingly, as the said long serial number serves as a control signal to decide the transmission route and direction of data flow, its objective is to facilitate the data in IC which flow from one data buffer to another data buffer with uncertain route and direction, making the data flow in different transmission route, thus expressing different voltage and current consumption in IC layout circuit, and the IC's behavior mode can be hidden. Therefore, it is hard to analyze the meaning of data through observation.

A detailed description of the structure design and technical principle of the invention will be provided as follows, and with reference to the attached Figures, further understanding of the characteristics of the invention can be attained.

BRIEF DESCRIPTION OF THE DRAWINGS

The present invention will now be specified with reference to its preferred embodiments illustrated in the drawings, in which.

DETAILED DESCRIPTION OF THE INVENTION

Figure 1:
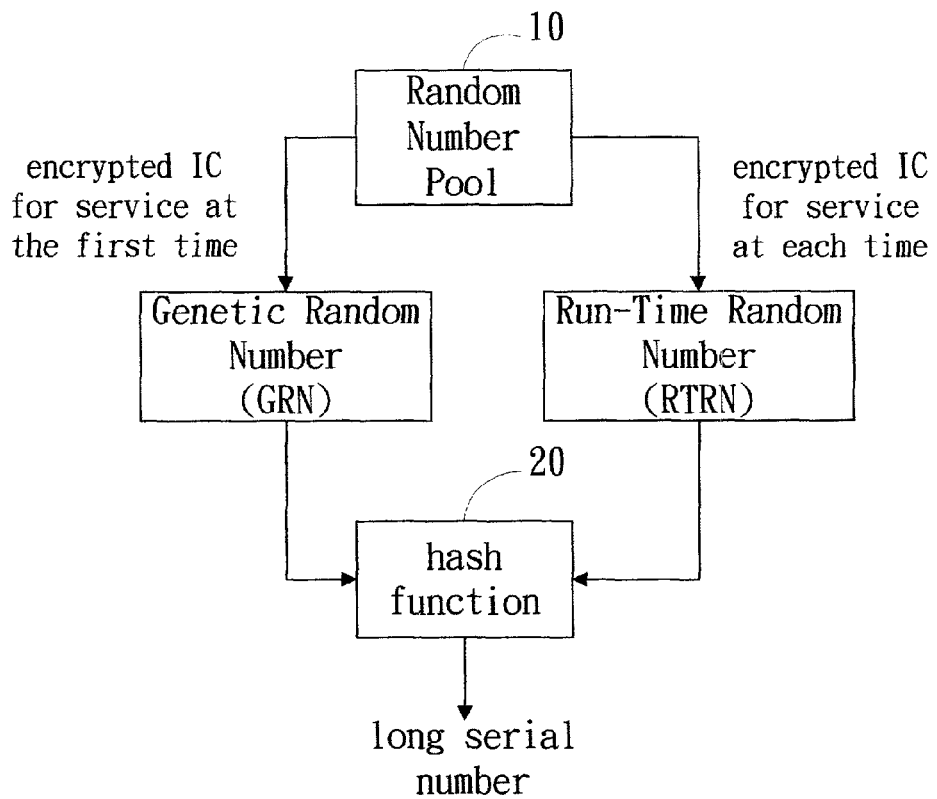
FIG. 1 shows the schematic block diagram of the production of the long serial number of the present invention.

Referring to FIG. 1, a control method of the invention, which makes IC operation mode provide with uncertainty, is mainly devised with one Random Number Pool 10 in IC, used to produce 2 sets of random number, Genetic Random Number (GRN) and Run-Time Random Number (RTRN). Wherein the said Genetic Random Number only produces a control code with individual characteristic of the IC during the first operation of IC;

the said Run-Time Random Number produces the deviated code with individual characteristic during each operation of IC, to make control of IC operation.

For example, the control code with individual characteristic produced by IC for the first operation is 50, the deviation quantity produced in the first operation is ±3, then its mean value may fall from 47 to 53; the deviation quantity produced in the second operation is ±8, then its mean value may fall from 42 to 58. In other words, the mean value of the control code for controlling the IC's operation during each production is different from each other, so it is hard to acquire the mean value through multi-average-testing. Each IC is provided with a unique control code, and each operation varies with the variation of deviation quantity. Thus next IC's operation mode will be with uncertainty, and the operation characteristic of IC is unable to be caught through observation method.

Figure 2A:
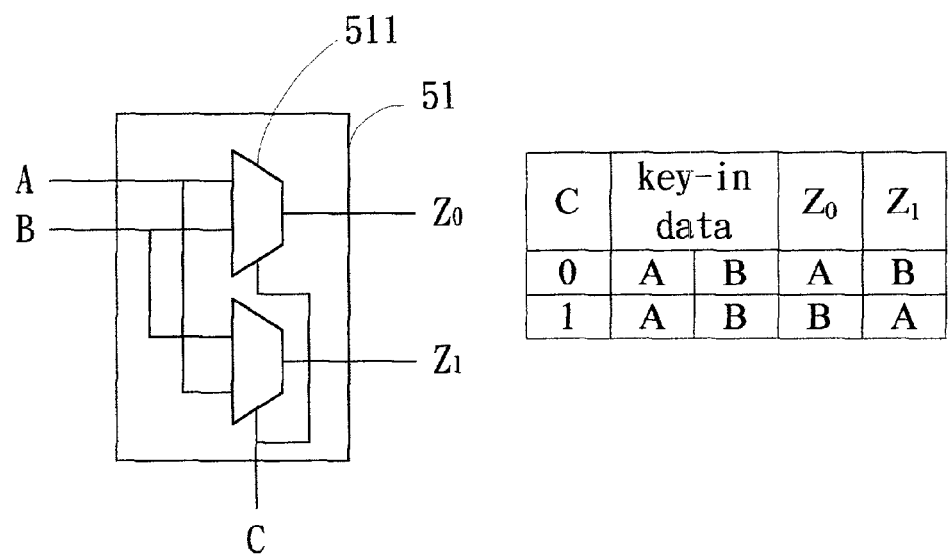
FIG. 2A is the logic circuit diagram and its real value chart of exchange circuit.
Figure 2B:
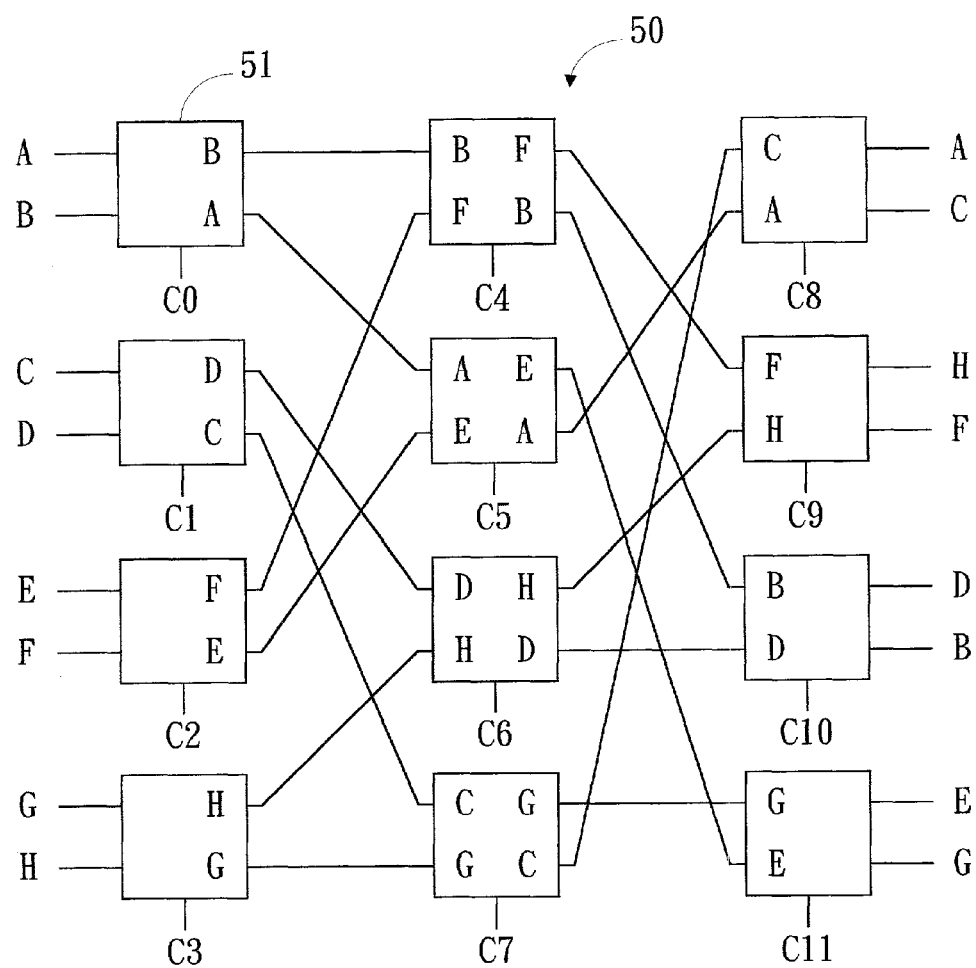
FIG. 2B shows the schematic block diagram of the shuffle network.
Figure 3:
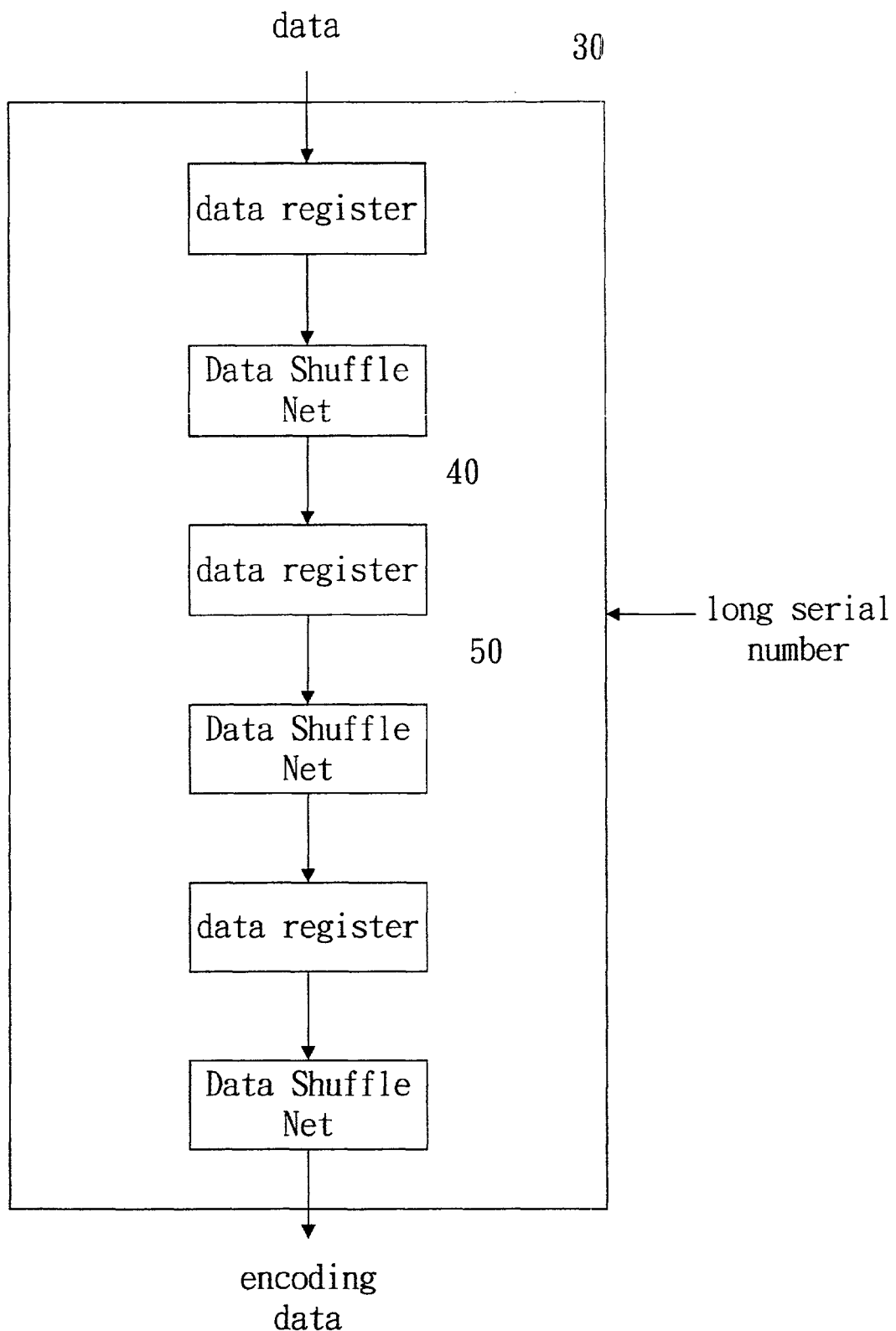
FIG. 3 shows the schematic block diagram of the data flow network.

The 2 sets of random number described above, produce a long serial number service for behavior control, through hash function 20; the said long serial number herein can be referred to as IC identity, because the probability of acquiring the same GRN in any 2 IC is less than $\frac{1}{2}^{256}$, (assuming the so produced long serial number is with 256 bits). Even if the same GRN is accessed in reality, the RTRN and hash function 20 may not produce the same long serial number. The said long serial number is utilized to control each bit of input IC data for various function controls, such as data shuffle, delay time, buffer allocation, data flow route and direction, etc. Below is the description of the first embodiment of the behavioral mode of IC data shuffle controlling:

FIG. 3 indicates a Data Flow Network 30, wherein consists of massive Data Register 40 and Data Shuffle Net 50 (as shown in FIG. 2B). The data store temporarily in the Data Register 40 after flowing into IC, and decide if shuffle and the complexity of shuffle through the long serial number controlling, which is mentioned above. In the end, one coding information can be obtained.

The shuffle of above data is to perform position shuffle of the original bit information, thus shuffling the prior and posterior of data sequence. Taking one 8-bit Data Shuffle Net 50 (as shown in FIG. 2B) for example, $2^3$ is 8, therefore, the said Data Shuffle Net 50 needs not more than 3 layers of structure to shuffle the data position to the most complicated situation.

As shown in FIG. 2A, the Data Shuffle Net 50 mentioned above is composed of a plurality of shuffle circuit 51; and each switch circuit is composed of two shuffle switches 511 in parallel connection. In FIG. 2A, the input data are A, B, with one bit of the long serial number serving as control bit C. As the control bit is 1, it enables shuffle switch 511 and then generates $Z_0$, $Z_1$ to engage in shuffle to form B, A; as the control bit C is 0, then the input data A, B remain without engagement of shuffle. Then taking the 8 bit basic unit Data Shuffle Net in practical application of Data Shuffle Net for example, (FIG. 2B), as described above, the said Data Shuffle Net has 3 layers of structure; each layer includes 4 shuffle circuits 51 (taking 2 inputs for example, 8÷2=4), then Data Shuffle Net 50 needs total of 3 (layers)×4 (units)=12 shuffle circuits 51, the starting of each shuffle circuit 51 is controlled by the bit configured in the long serial number (there are 12 bits as indicated in the FIG. C0~C11 to serve as control signals). Now assuming all shuffle circuits 51 are started, then key in data ABCDEFGH, after shuffle in the first layer, it turns to be BADCFEHG; after shuffle in the second layer, it turns to be FBEAHDGC; and after shuffle in the third layer, it turns to be ACHFDBEG. If the scale of Data Shuffle Net 50 is further expanded, for example, 8 Data Shuffle Net 50 is necessary, and each Data Shuffle Net 50 needs 12 control signals, then the Data Shuffle Net 50 with 64 bits will needs a long serial number with 96 bits for controlling.

Figure 2C:
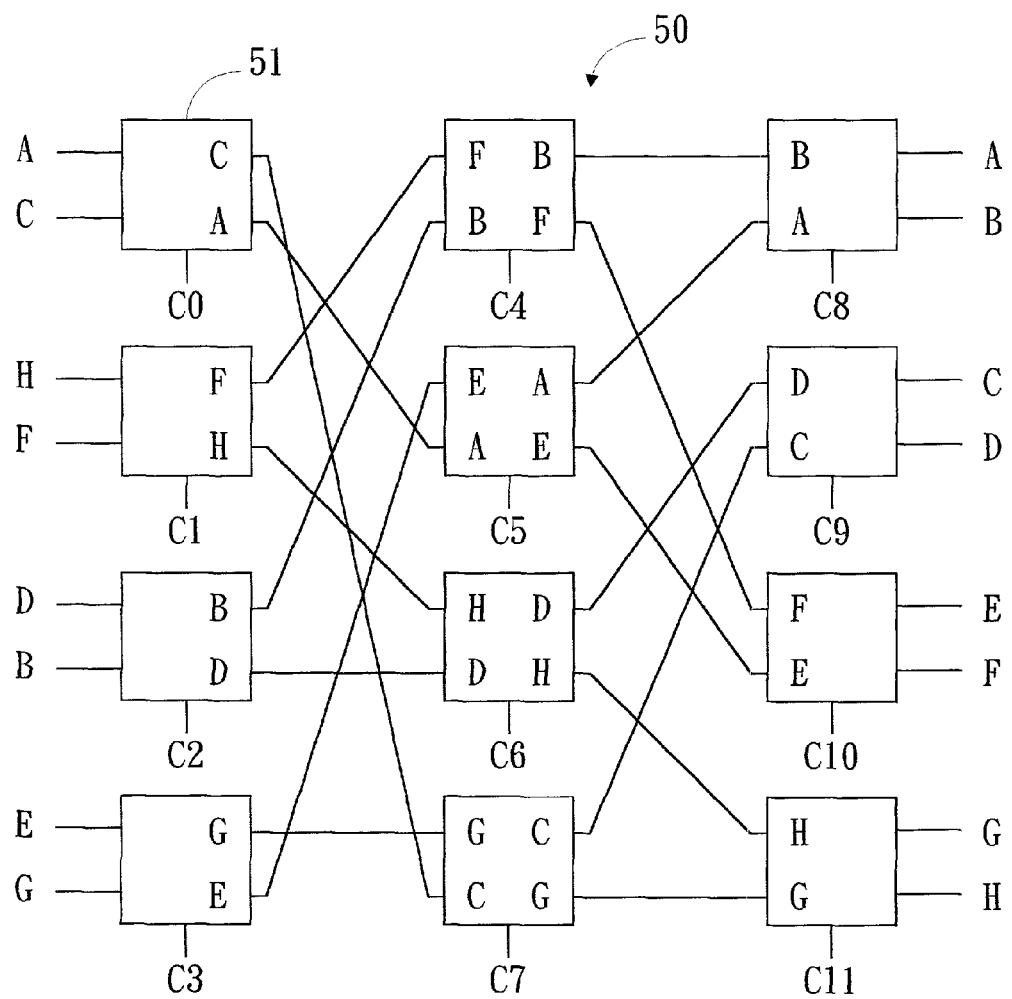
FIG. 2C shows the schematic block diagram of the shuffle network of the recovered data.

The data after shuffle are deemed to perform encoding action to data; therefore, if the said data shall be provided with further operation processing, it shall be recovered to the original data content, thus the correct calculation result can be acquired. What's indicated in FIG. 2C refers to a schematic block diagram showing the shuffle network of recovered data, which is in opposite pattern of FIG. 2B, and similarly is under control of a long serial number. In other words, the long serial number bit for controlling the shuffle circuit during shuffling will be registered, and the original data can be acquired through the same bit control shuffle circuit. Due to the previous assumption, if all shuffle circuits 51 are started, the obtained data after the shuffle will be ACHFDBEG which, after the shuffle of the first layer, turns into CAFHBDGE; after the shuffle of the second layer, turns into BFAEDHCG; and after the shuffle of the third layer, turns into ABCDEFGH. In this way, the originally keyed in data can be acquired to serve for the elements in need of the said data in processing, to acquire the correct computation result.

In the embodiment, the bit allocation merely intends to explain its performance, but not to limit the criterion of the invention. In addition, the number of bits shall be self-determined by the designer in view of actual requirement.

In a general IC layout, there is fixed flow route between one data buffer port and another data buffer port, in which the data flow transmit either in single-direction or dual-direction. The consumed energy of the data flow in the channel (that is, voltage and current consumption quantity) is fixed during each transmission, that is, the IC's behavior mode being exposed, and any IC may be analyzed by using the instrument observation method to what the data under processing by the IC at present is. Therefore, the invention shall be further explained in the following 3 embodiment, how to use a long serial number control to attain the objective of hiding IC behavioral mode, and make the data of any IC cannot be figured out with observation analysis method.

Figure 4A:
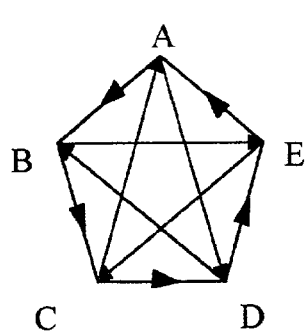
FIGS. 4A and 4B are pentacle basic structure diagrams of factual structure.
Figure 4B:
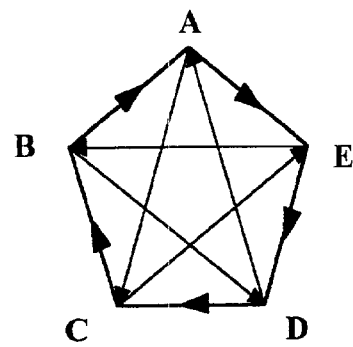

Below is the second embodiment of the invention, which describes the data flow channel arrangement for explanation:

In view that in electronic circuit, the consumed energy of the same data in different transition channels are different, therefore, in the embodiment, a long serial number is served as a control signal, which decides the data flow transmission route and direction. In the embodiment, the internal layout of the said IC is arranged according to the Factual Law. That is, compose each structure member in IC with several simplified units, which are composed with factual structure (to be Pentacle in the embodiment), and with this pentacle structure to engage in continuous repetition composition to form a comprehensive layout of the same function as the existed IC. Assuming the identified letters of each identification means various data buffer ports, then from one data buffer to another 4 data buffer ports, there always exist two possible transmission directions, clockwise (as shown in FIG. 4A) and counterclockwise (as shown in FIG. 4B).

Assuming the bit value "0" indicates clockwise direction, and bit value "1" as counterclockwise direction, then taking the embodiment of the pentacle structure for example, it needs the above mentioned 20 bits in the long serial number to serve as its transmission direction control. As indicted in Table 1, assuming the $110^{th}$ bit to $130^{th}$ bit in the long serial number are served as channel transmission control, and if the $110^{th}$ bit is "0", then it indicates from data buffer ports A to B is in clockwise direction; its channel may be selected among A-E-B, A-E-C-D-B, A-C-B, and A-C-E-B for transmission. Among the channel selection, the shortest one would be preferred. Therefore, the transmission can be selected between A-E-B and A-C-B. Therefore, similarly, in terms of transmission between data buffer ports, due to the difference of the transmission route, different voltage and current consumption is expressed, to hide the IC's behavior mode. It is hard to analyze the data's definition with observation method.

TABLE 1

| | ROUTE | | DIRECTION | |
|---|---|---|---|---|
| Bit | FROM | TO | CLOCKWISE (CW) | COUNTER-CLOCKWISE (CCW) |
| 110 | A | B | 0 | 1 |
| 111 | A | C | 0 | 1 |
| 112 | A | D | 0 | 1 |
| 113 | A | E | 0 | 1 |
| 114 | B | A | 0 | 1 |
| . | . | . | 0 | 1 |
| . | . | . | | |
| . | . | . | | |
| 119 | C | A | 0 | 1 |
| . | . | . | 0 | 1 |
| . | . | . | | |
| . | . | . | | |
| 128 | D | B | 0 | 1 |
| 129 | E | C | 0 | 1 |
| 130 | E | D | 0 | 1 |

The control access behavioral mode as follows shall serve as the explanation of the $3^{rd}$ embodiment:

The said long serial number can also control the access behavioral mode of 2 mainframes F, G (master) in parallel (such as: hard disc, display card, etc.) and DRAM 70.

Figure 5:
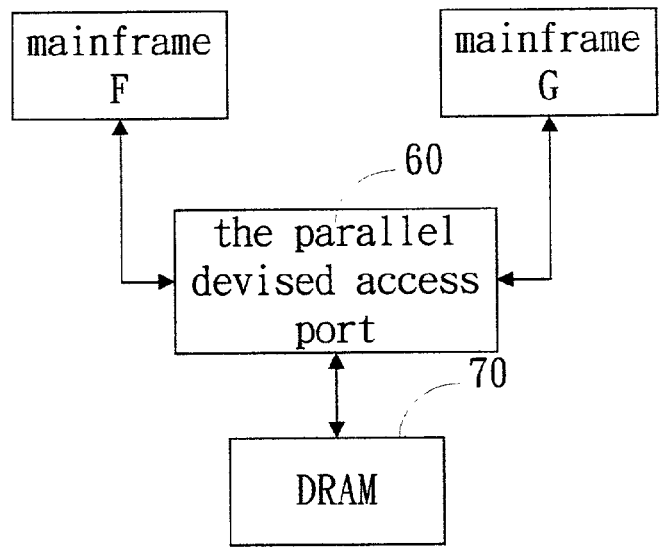
FIG. 5 shows the schematic diagram of the access framework between two parallel mainframes and DRAM.

Referring to FIG. 5, assuming there are two mainframes F, G in the system, which can access to DRAM 70 at the same time point, through the parallel devised access port 60, takes the example in Table 2 for explanation:

In Time T1, both mainframes F and G request for Read action.

In Time T2, mainframe F requests for Read action, and mainframe G requests for Write action.

In Time T3, mainframe F requests for Write action, and mainframe G requests for Read action.

In Time T4, both mainframes F and G request for Write action.

Of course, the prior access request shall be executed earlier. In other words, time point T1 will always be executed earlier than time points T2, T3, and T4. Because DRAM 70 can only accept one request at one time, in case access requests exist at the same time point, a conflict would occur. In the embodiment, a long serial number serves to decide the controlling of the priority of the same time point.

Referring to Table 3, assuming bit value "0" indicates "<", while bit value "1" indicates ">", the said long serial number only takes 4 bits to enable the decision of the Read or Write priority of the 2 mainframe devices F and G in parallel as follows:

TABLE 2

$R_{(F, R1)} > R_{(G, R1)} > R_{(F, R2)} > R_{(G, W2)} >$
$R_{(G, W3)} > R_{(F, W3)} > R_{(G, W4)} > R_{(F, W4)}$

| Time Point | MAINFRAME F | MAINFRAME G |
|---|---|---|
| T1 | Read action request"$R_{(F, R1)}$" | Read action request"$R_{(G, R1)}$" |
| T2 | Read action request"$R_{(F, R2)}$" | Write action request"$R_{(G, W2)}$" |
| T3 | Write action request"$R_{(F, W3)}$" | Read action request"$R_{(G, R3)}$" |
| T4 | Write action request"$R_{(F, W4)}$" | Write action request"$R_{(G, W4)}$" |

TABLE 3

| Bit | BIT VALUE | MAINFRAME F | PRIORITY | MAINFRAME G |
|---|---|---|---|---|
| Bit 131 | 0 | Read | < | Read |
| | 1 | Read | > | Read |
| Bit 132 | 0 | Read | < | Write |
| | 1 | Read | > | Write |
| Bit 133 | 0 | Write | < | Read |
| | 1 | Write | > | Read |
| Bit 134 | 0 | Write | < | Write |
| | 1 | Write | > | Write |

Below is the explanation of the $4^{th}$ embodiment of buffer controlling:

The long serial number mentioned above may also be applicable to control between any two data buffer ports H and I, to control the desired data buffer 80.

Assuming there are 6 data buffers 80 between data buffer ports H and I (take 6 for explanation in the embodiment, and in practice it may not be 6, can be any other numbers), as shown in Table 4, 3 bits in the long serial number serve as control for data buffer 80.

Figure 6:
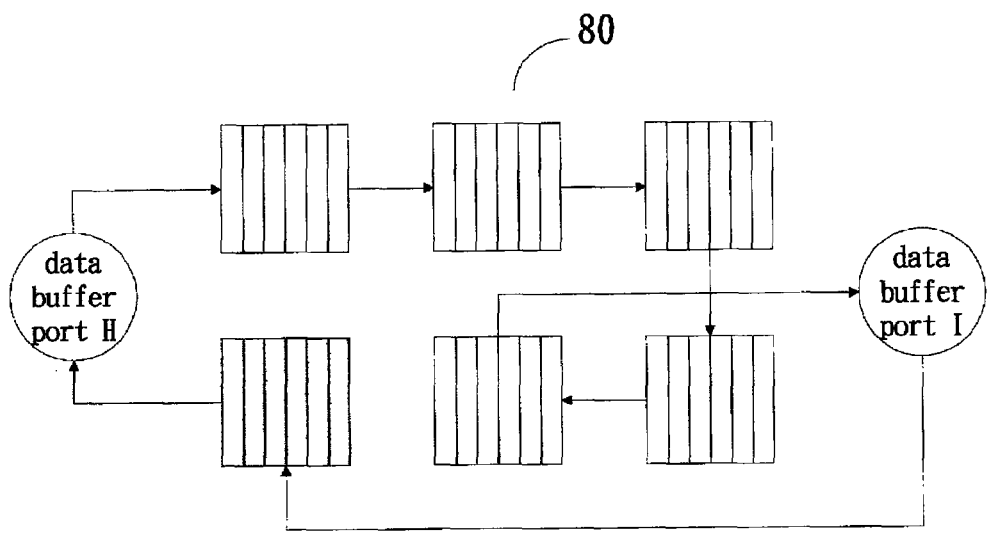
FIG. 6 to FIG. 8 show the embodiment of the buffer which is utilized to control the long serial number between any two data buffer ports.
Figure 7:
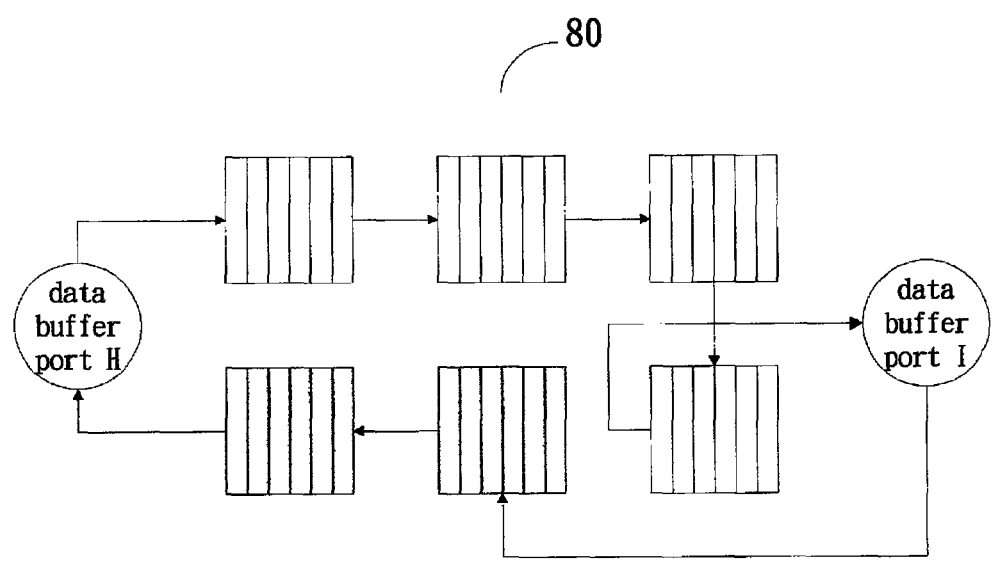
Figure 8:
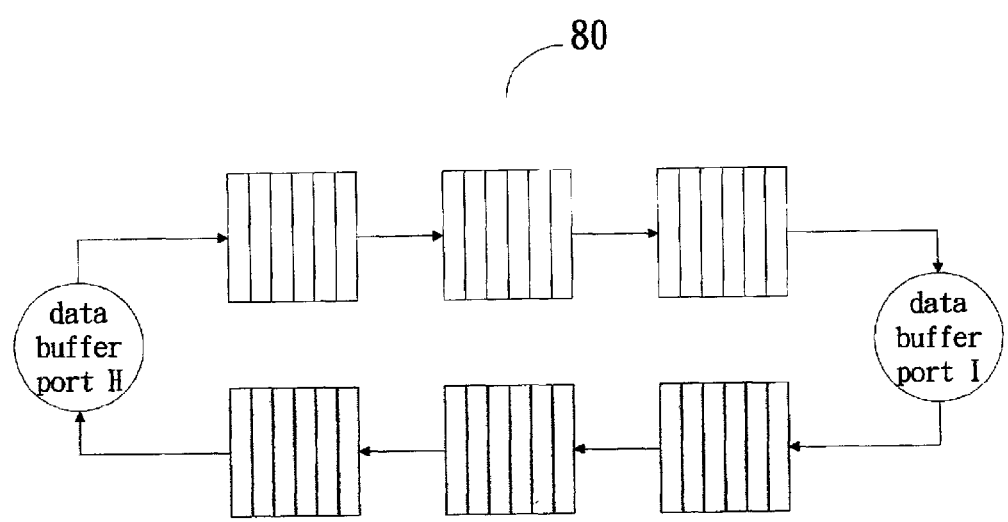

All possible data buffer 80 service is as follows:

1. The data will go through 6 data buffers 80 from buffer ports H to I, but no data through data buffer from I to H (these 3 bits as shown in Table 4 to be "000").
2. The data will go through 5 data buffers 80 from buffer ports H to I, but the data only go through 1 data buffer 80 from 1 to H (these 3 bits as shown in Table 4 to be "000")(as shown in FIG. 6).
3. The data will go through 4 data buffers 80 from buffer ports H to I, but data only through 2 data buffers 80 from I to H (these 3 bits as shown in Table 4 to be "010")(as shown in FIG. 7).
4. The data will respectively go through 3 data buffers 80 from buffer ports H to I, and from buffer ports I to H (these 3 bits as shown in Table 4 to be "011")(as shown in FIG. 8).
5. The data will go through 2 data buffers 80 from buffer ports H to I, but the data go through 4 data buffers 80 from 1 to H (these 3 bits as shown in Table 4 to be "100")(data flow arrow direction is opposite to that in FIG. 7, not shown in the Figure).
6. The data will go through 1 data buffer 80 from buffer ports H to I, but the data go through 5 data buffers 80 from 1 to H (these 3 bits as shown in Table 4 to be "101")(data flow arrow direction is opposite to that in FIG. 6, not shown in the Figure).

7. The data will go through 6 data buffers 80 from buffer ports H to I, but no data go through data buffer 80 from I to H (these 3 bits as shown in Table 4 to be "110").

TABLE 4

| BIT VALUE | THE DATA BUFFER NO. REQUIRED FOR DATA TO GO THROUGH FROM BUFFER PORTS H TO I | THE DATA BUFFER NO. REQUIRED FOR DATA TO GO THROUGH FROM BUFFER PORTS I TO H |
|---|---|---|
| 000 | 6 | 0 |
| 001 | 5 | 1 |
| 010 | 4 | 2 |
| 011 | 3 | 3 |
| 100 | 2 | 4 |
| 101 | 5 | 1 |
| 110 | 0 | 6 |

The data transmission from buffer port H to buffer port I going through one data buffer 80 indicates the data delay for a proper time, making the data processing time of IC is not fixed, and an external party cannot predict the correct data point through the random time points, i.e., what's intercepted is not the desired data, so as to protect the safety of the system.

Concluding what's mentioned above, the control method which makes IC's operation mode with uncertainty is provided within the invention, by means of two random numbers to produce the IC control signal, making its operation mode to vary with the variation of random numbers and thus with uncertainty. As it is applied to e-commerce, data security or encryption/decryption treatment process, because IC behavior is uncertain, that a hacker cannot obtain any fixed operation mode of IC through analysis of a single IC for breakthrough, so as to ensure the data security, concerning the defect of traditional IC with only single operation mode, which is easily broken through, an effective solution and strategy are provided.

While the present invention has been particularly shown and described with reference to preferred embodiments, it will be understood by those skilled in the art that various changes in form and detail may be without departing from the spirit and scope of the present invention.

I claim:

1. A control method to make IC's operation mode to be provided with uncertainty, which includes following steps:
   a. produce Genetic Random Number and Run-Time Random Number, wherein the said Genetic Random Number decides the time delay deviation quantity of the said IC during its first operation, the said Run-Time Random Number decides the time delay deviation quantity of the said IC during each of its operation;
   b. make the said Genetic Random Number and the said Run-Time Random Number produce a long serial number including at least one group of control bits through a hash function, and
   c. use the control bit included in the said long serial number to serve as a control signal to control the operation of the said IC.

2. A control method as recited in claim 1, wherein the step c includes the control of the data order shuffle of the internal data buffer of the said IC.

3. A control method as recited in claim 2, wherein the order shuffle step of the said control data is realized by means of a Data Shuffle Net.

4. A control method as recited in claim 1, wherein step c includes the transmission route of the control data within the data buffer ports inside the said IC.

5. A control method as recited in claim 4, wherein the transmission route of the shortest distance serves as the transmission route between the data buffer ports inside the said IC.

6. A control method as recited in claim 1, wherein step c includes the control of the said IC through the said long serial number, to control the access of the order of a register media to at least two mainframes.

7. A control method as recited in claim 1, wherein step c includes the control of the transmission route of the data passing through data buffer between two data buffer ports.

* * * * *